(12) United States Patent
Wilcox et al.

(10) Patent No.: US 8,224,147 B2
(45) Date of Patent: Jul. 17, 2012

(54) INTERCONNECTED MULTIMEDIA SYSTEMS WITH SYNCHRONIZED PLAYBACK

(75) Inventors: Peter W. Wilcox, Los Altos, CA (US); Robert M. Brown, Jr., Sunnyvale, CA (US); Brad M. Thayer, San Francisco, CA (US); Stephen Z. Stein, Acton, MA (US); Francois Tremblay, Wilmington, MA (US)

(73) Assignee: Avid Technologies, Inc., Burlington, MA (US)

( * ) Notice: Subject to any disclaimer, the term of this patent is extended or adjusted under 35 U.S.C. 154(b) by 1116 days.

(21) Appl. No.: 12/082,767

(22) Filed: Apr. 14, 2008

(65) Prior Publication Data

US 2008/0253736 A1     Oct. 16, 2008

Related U.S. Application Data

(60) Provisional application No. 60/923,735, filed on Apr. 15, 2007.

(51) Int. Cl.
*G11B 27/10* (2006.01)
*G11B 27/00* (2006.01)

(52) U.S. Cl. .......................................... 386/54; 386/201
(58) Field of Classification Search ..................... 386/54, 386/201
See application file for complete search history.

(56) References Cited

U.S. PATENT DOCUMENTS

| | | | |
|---|---|---|---|
| 5,754,784 A * | 5/1998 | Garland et al. | 709/219 |
| 2006/0002681 A1 * | 1/2006 | Spilo et al. | 386/46 |

FOREIGN PATENT DOCUMENTS

| | | |
|---|---|---|
| EP | 1122931 | 8/2001 |
| EP | 1398931 | 3/2004 |
| EP | 1808848 | 7/2007 |
| WO | WO97/37476 | 10/1997 |
| WO | WO2004/043032 | 5/2004 |

OTHER PUBLICATIONS

Furfaro et al., Mulimedia Synchronization based on aspect oriented programming, Mar. 2004, Microprocessors and microsystems, IPC Business Press LTD, London, GB, vol. 28, No. 2, pp. 47-56.*

(Continued)

*Primary Examiner* — Jeffrey Pwu
*Assistant Examiner* — Samuel Ambaye
(74) *Attorney, Agent, or Firm* — Oliver Strimpel

(57) ABSTRACT

One or more digital audio systems, such as a digital audio workstation, and one or more digital video systems, such as a video server, are interconnected by a computer network. A communication protocol among the systems using the computer network enables the systems to play back in synchronization. The communication protocol defines several states for connections between systems. In particular, two systems may be disconnected, connected and unlinked or connected and linked. Each system transitions through defined state changes that are caused by a sequence of commands in the communication protocol, called a play start sequence, to initiate synchronized playback. The play start sequence can be initiated by any of the linked systems. The communication protocol includes a mechanism for distributing a running time clock from the digital audio system for synchronizing with the digital video system when the digital audio system and digital video system are not both synchronized by the same video reference signal.

8 Claims, 5 Drawing Sheets

OTHER PUBLICATIONS

Bauge, T., et al., "QoS Provisioning in an IP-based Studio Production Network", internet citation, http://citeseer.nj.nec.com/cache/papers/cs/13835/http:zSzzSzwww.ee.surrey.ac.ukzSzPersonalzSzG.PavlouzSzPublicationszSzConference-paperszSzBauge-00.pdf/bauge00qos.pdf, retrieved on Jan. 19, 2004.

Chung-Ming Huang et al., "An EFSM-Based Multimedia Synchronization Model and the Authoring System", IEEE Journal on Selected Areas in Communications, IEEE Service Center, Piscataway, US, vol. 14, No. 1, Jan. 1, 1996.

Edison, John, "IEEE 1588 Standard Version 2—A Tutorial", internet citation. Oct. 2, 2006, http://ieee1588.nist.gov/2006 IEEE1588 Agenda/Edison_1588_Version 2.pdf, pp. 1-21, retrieved on Jul. 23, 2008.

Furfaro, A. et al., "Multimedia synchronization baed on aspect oriented programming", Microprocessors and Microsystems, IPC Business Press Ltd., London, GB, vol. 28, No. 2, Mar. 1, 2004, pp. 47-56.

Garner et al, "IEEE 802.1 AVB and Its Application in Carrier-Grade Ethernet [Standards Topics]", IEEE Communications Magazine, IEEE Service Center, Piscataway, US, vol. 45, No. 12, Dec. 2007, pp. 126-134.

Garner G.M., "Description of Use of IEEE 1588 Peer-To-Peer Transparent Clocks in A/V Bridging Networks (Revision 2.0)", internet citation, http://www.ieee802.org/1/files/public/docs2006/use-of-p2pTc-in-avb-v2p0-060512.pdf, retrieved on Jul. 24, 2006.

Masataka Goto et al., "RMCP: Remote Music Control Protocol—Design and Applications-", ICMC International Computer Music Conference Proceedings, Jan. 1, 1997, pp. 446-449.

Nikoloas Laotaris et al., "Intrastream Synchronization for Continuous Media Streams: A Survey of Playout Schedulers", IEEE Network, IEEE Service Center, NY, NY, US., vol. 16, No. 3, May 1, 2002, pp. 30-40.

Teener, M.J., "AV Bridging and Ethernet AV™", internet citation, Mar. 2, 2007, XP007905291, http://www.ieee802.org/1/files/public/docs2007/as-mjt-AVB-Combo-For-ITU-0307.pdf, p. 3, 8-29, 35-38.

* cited by examiner

INTERCONNECTED MULTIMEDIA SYSTEMS WITH SYNCHRONIZED PLAYBACK

CROSS-REFERENCE TO RELATED APPLICATIONS

This application claims the benefit of priority to U.S. provisional patent application Ser. No. 60/923,735, filed 15 Apr. 2007 and entitled "INTERCONNECTED DIGITAL AUDIO WORKSTATION AND VIDEO SERVER WITH SYNCHRONIZED PLAYBACK", the contents of which are incorporated herein by reference.

BACKGROUND

It is common in the production of major motion pictures and television programming to use a digital audio workstation to create and edit complex sound effects, process dialog and otherwise edit and enhance the audio portion of a program. During audio editing the sound editor usually needs to see the video portion of the program with which the audio is synchronized.

Typically, an audio editing system, such as a digital audio workstation, is dedicated to editing audio, and a separate video playback system, such as a video server, plays the video. Additionally, multiple digital audio workstations are used to provide more processing power and more complex workflows. This architecture enables the audio systems to be dedicated to audio processing. However, the video playback system needs to be synchronized with each audio system. Most systems provide such synchronization by locking time codes used by both the audio and video systems. The present invention provides some improvements to such synchronization.

SUMMARY

The present invention is directed to the synchronization of play back in multimedia systems. In a first embodiment, one or more digital audio systems, such as a digital audio workstation, and one or more digital video systems, such as a video server, are interconnected by a computer network. A communication protocol among the systems using the computer network enables the systems to play back in synchronization. In other embodiments, the one or more digital video systems are optional, and the communication protocol synchronizes play back of the multiple digital audio systems on the computer network. Unless otherwise specified, the term 'multimedia systems' will be used interchangeably herein to refer to digital audio systems and/or digital video systems.

The communication protocol defines several states for connections between the multimedia systems. In particular, two systems may be disconnected, connected and unlinked or connected and linked. When disconnected, the systems do not send or respond to communications in this protocol, except for connect instructions. When connected and unlinked, the systems do not initiate or respond to playback instructions to or from each other. When connected and linked, the systems playback in synchronization when instructed to play. A user may instruct the systems to be unlinked, for example, if the user wanted to perform some local operations on the digital audio system without running the digital video system.

When linked with another system, each digital audio system and digital video system implements a state machine. The state machine allows the system to execute a sequence of instructions that prepare the connected systems to playback in synchronization. Each system transitions through defined state changes that are caused by a sequence of commands in the communication protocol, called a play start sequence. The play start sequence can be initiated by any of the linked systems.

The communication protocol includes a mechanism for distributing a running time clock from a first digital audio system for synchronizing with one or more connected multimedia systems.

In particular, the first digital audio system periodically sends to each of the connected multimedia systems a current running time. The running time is based on the audio sample clock that is used in the first audio system's playback engine. Each connected multimedia system replies with another message to test whether the received running time is valid. If the running time is valid, the connected multimedia system updates a correlator which retains the last several values of the running time that it has received. If the connected digital audio and/or digital video systems need to determine what the overall system time is, they read their own CPU clock then use the best fit straight line in the clock correlator to determine what the overall multi-computer system running time is.

DETAILED DESCRIPTION

Figure 1:
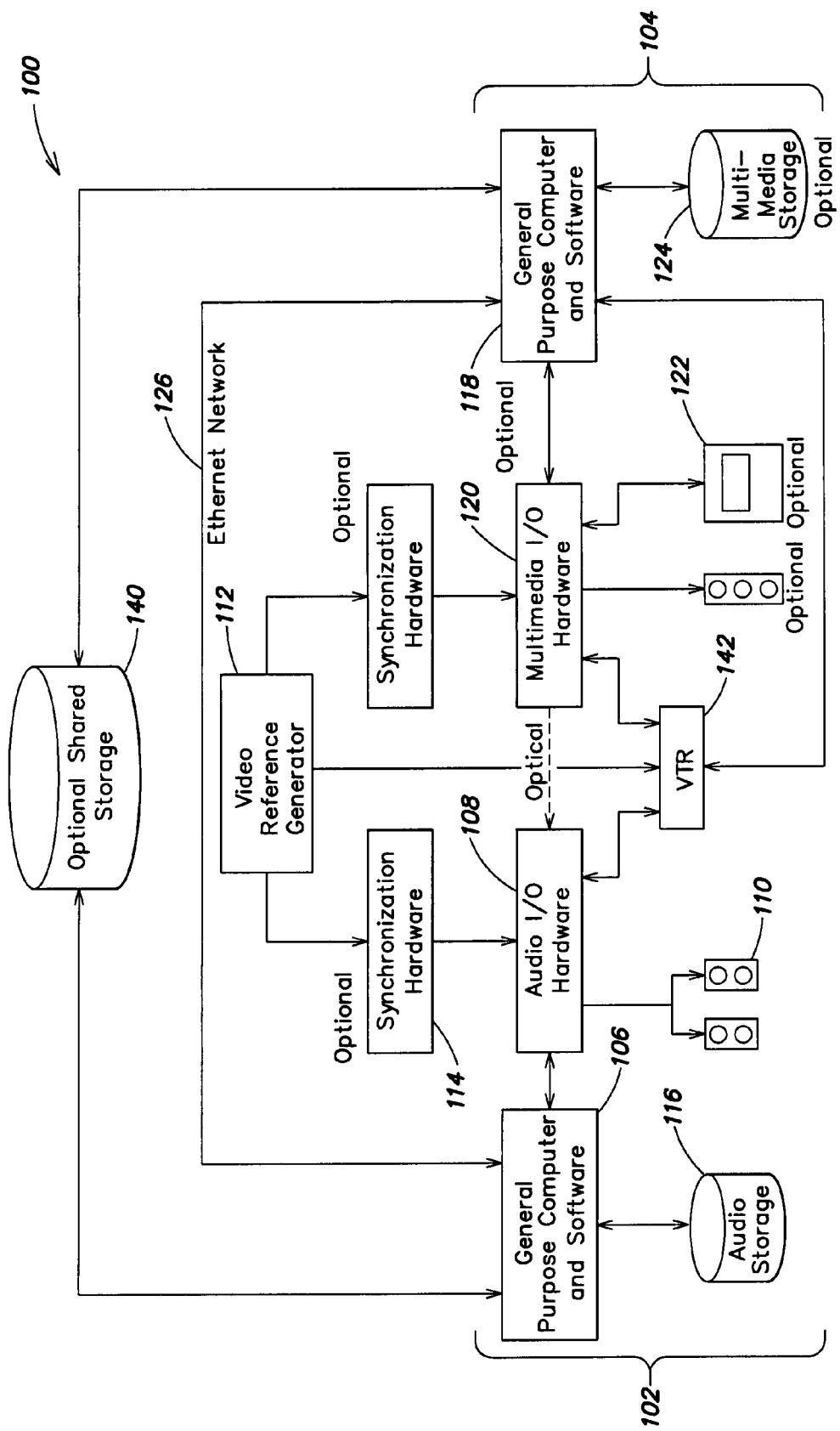
FIG. 1 is an example block diagram of a system with an interconnected digital audio system and digital video system.

FIG. 1 is block diagram of a system 100 in which a digital audio system 102 is interconnected with another multimedia system 104, which may comprise a digital video system that, with digital audio system 102 provides synchronized audio and video playback through speakers 110 and display 122. A network connection 126, such as an Ethernet connection, connects the digital audio system and connected multimedia system to enable them to communicate with each other to enable such synchronization to occur. There may be one or more digital audio systems and one or more digital video systems interconnected by the network 126.

Digital Audio to Digital Video System(s) Configuration

In a first embodiment of the invention, wherein multimedia system 104 comprises a digital video system, digital audio system 102 is used to edit and process audio data that is intended to be played back in conjunction with corresponding video data. The video data is stored on the digital video system 104 to enable the digital audio system 102 to be dedicated to audio processing. In general, the digital video system is instructed by the digital audio system to play back video either at a specific point in time in a composition (displaying one image), or starting from a specific point in time (displaying several images in a sequence) at a specified rate.

The digital audio system 102 may be implemented using a general purpose computer 106, and associated computer programs that provided functions for editing audio data, such as a digital audio workstation. An example computer program is the PRO TOOLS software, and associated peripherals available from Avid Technology, Inc., of Burlington, Mass. The digital audio system 102 also includes associated special purpose audio input/output (IO) hardware 108 for performing digital signal processing on audio data and to generate audio outputs to speakers 110. Example audio JO hardware is the DIGIDESIGN 192 peripheral, or other PRO TOOLS HD peripheral, available from Avid Technology, Inc. The audio IO hardware 108 is synchronized to a video reference signal from a video reference generator 112, such as a black burst or tri-level sync generator, using synchronization hardware 114. The synchronization hardware may implement synchronization described in, for example, U.S. Pat. Nos. 6,134,379 and 6,393,198, hereby incorporated by reference. Example synchronization hardware is the SYNC or SYNC HD peripherals available from Avid Technology, Inc. The synchronization hardware ensures that the audio and video do not drift from their original alignment at the start of playback. The digital audio system 102 also includes mass storage 116, which may be limited to storing only audio data in computer readable data files. The system 102 also may access audio data stored on an optional shared storage system 140.

The digital video system embodiment of multimedia system 104 may be implemented using a general purpose computer 118, and associated computer programs that provide functions for editing and playing back video data, such as a video server. An example computer program is the Media Station|PT software from Avid Technology, Inc. This software has an operational mode called "satellite mode" which enables it to receive commands from another device which in turn permits the other device to control it. The digital video system may include associated special purpose video IO hardware 120 for processing the video data for output to a display 122. Example video IO hardware includes a DVI output, or a peripheral device, such as the Mojo or Adrenaline series peripheral devices available from Avid Technology, Inc., which displays video on a television monitor. Video IO hardware also may be part of the general purpose computer that displays video on a computer display. The video IO hardware also may be connected to receive the video reference signal from the video reference generator 112.

Edited video data, and other video data to be played back by the digital video system, may be defined by a sequence of one or more segments of video data from one or more data files on storage accessible by the digital video system. Video data may be stored on a local mass storage system 124, which may be limited to storing video data but also may be used for audio playback. Video and audio data also may be stored on and accessed from the optional shared storage 140.

The network connection 126, such as an Ethernet connection, connects the digital audio system and digital video system to enable them to communicate with each other to enable such synchronization to occur. This connection can either be direct or via a larger network and serves at least three purposes: transport control between the systems, record commands for audio/video capture and mounting the video storage 124 on the audio system 102 to permit transfer of audio files to and from the audio storage 116.

An optional video deck 142 (either standard definition or high definition) also may be included in the system. The video inputs and outputs of the video deck 142 are connected to the video IO hardware 120 or IEEE-1394 port of the computer 118. The audio inputs and outputs of the video deck 142 are connected to the audio IO hardware 108. Serial 9-pin machine control, if available on the deck, may be connected to the serial port of the computer 118, which allows it to be controlled by the video system. If used, the video deck also may be connected to receive the video reference signal.

If available on the video IO hardware 120 and the audio IO hardware 108, an optical out connection of the video IO hardware can be connected to an optical in connection of the audio IO hardware. This connection permits, for example, confidence monitoring of the audio output from the video system.

Digital Audio to Digital Audio System(s) Configuration

As noted above, in an alternate synchronization system in accordance with the invention, synchronization is achieved between multiple digital audio systems, with or without a connected digital audio system. In such configurations, multimedia system 104 comprises one or more digital audio systems, such as digital audio workstations. The digital audio workstation 104 could similarly comprise a computer program such as the PRO TOOLS software, and associated peripherals available from Avid Technology, Inc. In such embodiments, multimedia I/O hardware 120 comprises special purpose audio input/output (IO) hardware for performing digital signal processing on audio data and to generate audio outputs to speakers. Example audio 10 hardware is the DIGIDESIGN 192 peripheral, or other PRO TOOLS HD peripheral, available from Avid Technology, Inc.

Synchronizing Operation

Having now described example structures for such a system, its operation will now be described. There are three primary operations in this system. First, the first digital audio system and the one or more multimedia systems interconnected on the network establish a connection, after which they begin to communicate regarding playback. Second, after a connection is established, one of the first digital audio system and the one or more connected multimedia systems initiate a process to link their playback. When the digital audio system and connected multimedia system are linked, they can send, look for and respond to messages between them for playback.

Either the digital audio system 102 or multimedia system 104 may initiate a connection between them, but it is typically a user of the digital audio system that selects an available digital video system with which to connect. Both the digital audio system and the multimedia system, when not connected for playback, are nonetheless interconnected by the network connection 126. Each system has an executing process that monitors communication on the network communication 126. This process should be able to respond to messages asking the system to identify itself and to connect with or disconnect from another system.

To discover which multimedia systems are available, the digital audio system sends a broadcast message on the network asking all multimedia systems to identify themselves. Each multimedia system has an executing process that responds to this message, identifying itself. The digital audio system then populates a list of available multimedia systems and displays this list to the user. The user then may select a multimedia system with which to connect. A similar process could be made available on each multimedia system to identify available digital audio systems.

Given a selected multimedia system, and an instruction from the user to connect with it for playback, the digital audio system sends it a "connect" message. The digital audio system initiates any processes required to enable it to playback audio, and initiates a process to monitor the network for communications which include playback instructions from the multimedia system. In response to the connect message, the multimedia system initiates any processes required to enable it to playback video or audio (i.e., depending upon whether multimedia system is a digital video or digital audio system), and initiates a process to monitor the network for communications which include playback instructions from the digital audio system. These communications are performed according to a protocol described in more detail below. After the digital audio system and multimedia system are "connected", each is prepared to receive instructions from the other regarding playback.

When "connected," it is possible that the digital audio system and the multimedia system are not intended by the user to always play back together. Thus, the connected systems have an additional state, indicating whether they are linked or unlinked for playback. Thus, any pair of digital audio system and multimedia system may be either disconnected, connected and unlinked, or connected and linked. When disconnected, the systems do not send or respond to communications in this protocol, except a connect instruction. When connected and unlinked, the systems do not initiate or respond to playback instructions to or from each other. When connected and linked, the systems playback in synchronization when instructed to play. A user may instruct the systems to be unlinked, for example, if the user wanted to perform some local operations on the digital audio system without running the multimedia system.

Figure 2:
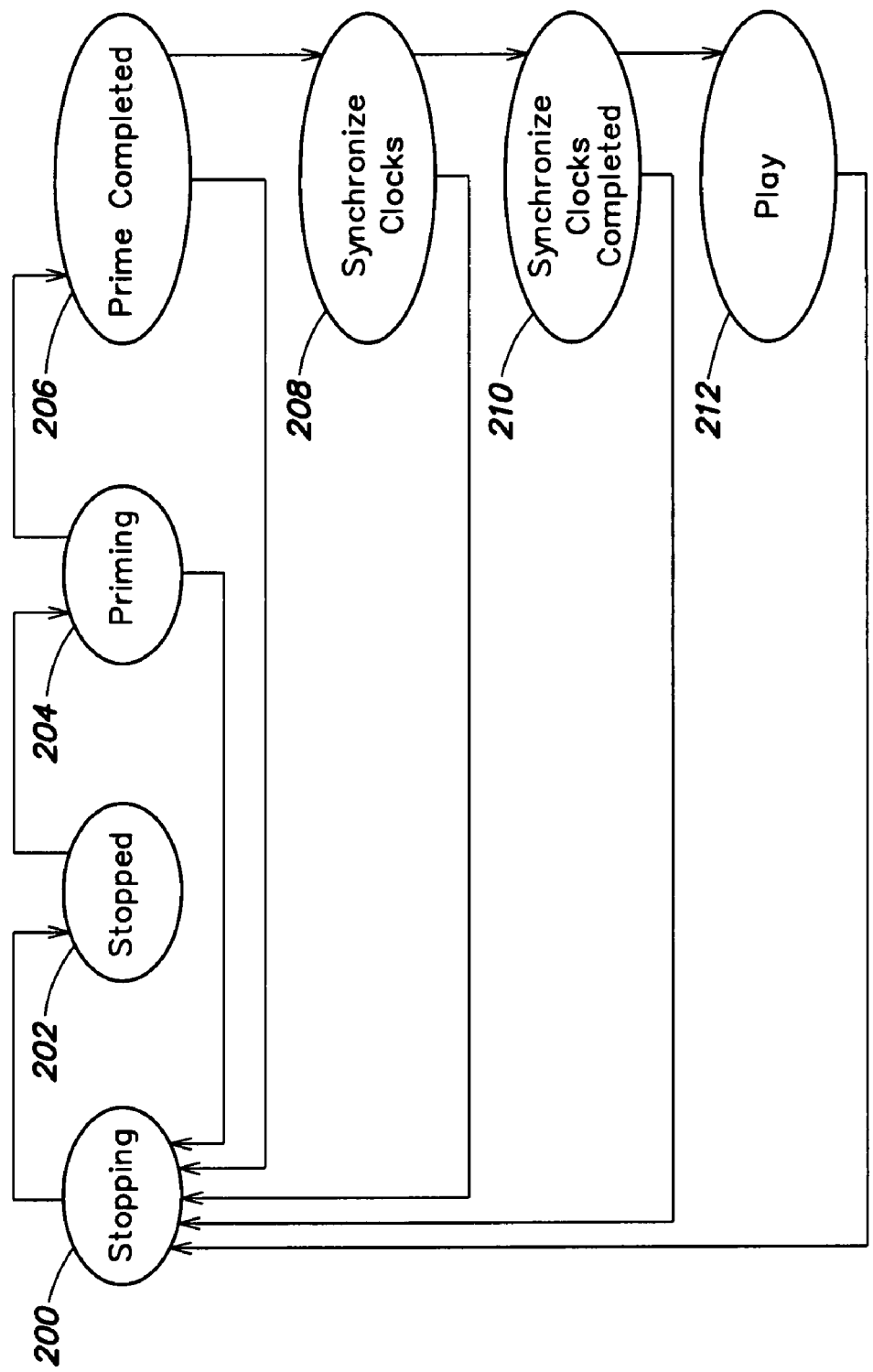
FIG. 2 is a state diagram for an example implementation of each of the interconnected systems.

When linked with another system, each digital audio system and multimedia system implements a state machine. The state machine allows the system to execute a sequence of instructions that prepare the connected systems to playback in synchronization. Each system transitions through defined state changes of stopping, stopped, priming, prime completed, synchronize clocks, synchronize clocks completed, and play. Any state can transition directly to stopping. All other state transitions are defined by the following sequence as illustrated in FIG. 2: Stopping (200)→Stopped (202) →Priming (204)→Prime Completed (206)→Synchronize Clocks (208)→Synchronize Clocks Completed (210)→Play (212). Each system's terminal state is the stopped state.

The transitions between these states are caused by a sequence of commands, called a play start sequence, which initializes both the digital audio system 102 and the multimedia system 104 to enable them to quickly synchronize and start playback. This play start sequence is a bidirectional protocol that provides the same sequence for starting synchronized playback between the digital audio system and multimedia system. Thus, either system may initiate the sequence. The sequence of commands is independent of which system starts playback.

The play start sequence will now be described in connection with the flow chart of FIG. 3. The system initiating playback sends (300) a "prime" command which contains the points to start and stop playback. Both systems transition from the stopped state 202 to the prime state 204 to prepare to playback (302) their respective data from the specified start point through to the specified stop point. This preparation may include, for example, identifying and verifying availability of data files and loading data into buffers for playback from those data files. After priming has completed on both systems, then the systems transition to the prime completed state 206.

Figure 3:
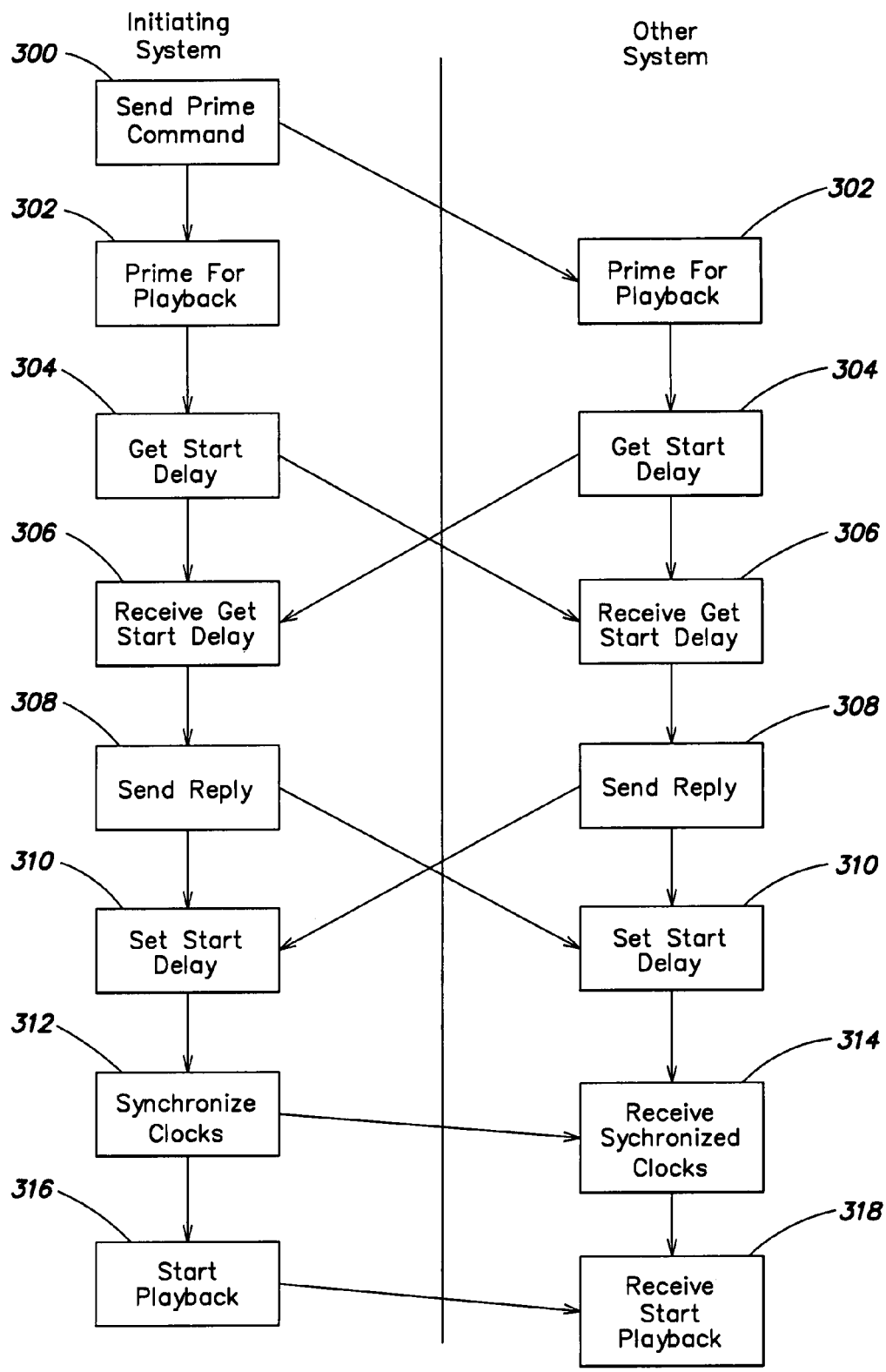
FIG. 3 is a flow chart describing an example play start sequence.

Also shown in FIG. 3, the systems negotiate how much delay is required to start playback using a "get start delay" command. In the embodiment shown in FIG. 3, this command is done after the prime operation, and is be performed before the system transitions to the prime completed state 206. However, the start delay determination can happen at any of the major states in the play start sequence. The negotiation of the start delay involves having each system send (304) the other system a message requesting its start delay. When a system receives the get start delay command (306), it issues a reply (308) with its start delay, from which the overall start delay is determined. Each system generally has a start delay that has been empirically defined and stored in the system for each of a set of playback modes. The system retrieves this data and sends it to the requesting system. The largest start delay among the systems is set (310) as the start delay. When playback is eventually triggered, the time difference between when a "start playback" command, described below, is sent and the actual play start time is slightly greater than the determined start delay.

When in the "priming compete" state, the system initiating playback may send (312) a "synchronize clocks" command and transitions to the synchronize clocks completed state 208. The system receiving (314) this message also transitions to the synchronizing clocks state 208. The clock synchronization is then performed by, or received by, each system. After a system has a synchronized its clocking system, the system transitions to the synchronize clocks completed state 210. As a part of the synchronizing clocks process, a grid of frame edges in terms of running times into the future and thus establishes the potential starting times. The frame edge represents an audio sample time that corresponds to the beginning of a video frame.

The digital audio system 102 computes a frame edge using the synchronization hardware 114. The synchronization hardware receives an external reference signal (the video reference signal from video reference generator 112 in FIG. 1) and, based on a clocking signal in this reference signal, such as a black burst or tri-level signal, provides a sample count that corresponds to a frame edge. Subsequent frame edges may be computed from this sample count through extrapolation.

There are a number of ways for the multimedia system to compute the frame edge. First, if the multimedia system IO hardware 120 is connected to receive the video reference signal, then a driver associated with the multimedia IO hardware 120 may be used to obtain a frame edge time. In particular, the driver may read a system clock upon an indication from the multimedia IO hardware that a frame edge (black burst) was detected in the video reference signal received by the multimedia IO hardware.

If multimedia system 104 does not have multimedia IO hardware 120 connected to the video reference generator 112 to receive the reference signal, multimedia system 104 can request the time of the video frame edge from the audio system after the audio system is in the synchronize clocks completed state. The multimedia system may request this information using a "get frame edge in running time" command, described in more detail below.

If the audio system does not have video reference signal, such as a black burst or tri-level signal, connected to the synchronization device or there is no synchronization device present, the audio system can request the time of the video frame edge from the another audio system after that audio system is in the synchronized clocks completed state. The audio system may request this information using a "get frame edge in running time" command, described in more detail below.

If none of the networked systems system has a video reference signal, such as a black burst or tri-level signal, connected or none of the systems are connected to a synchronization device, the audio system and multimedia system playback is not externally aligned to any reference. The audio systems and multimedia systems are internally aligned within the accuracy of the correlated network clock. The audio systems and multimedia systems are aligned to each other with respect to the computed frame edge grid but they are not externally aligned to a reference signal.

At any time after the synchronize clocks completed state has been reached on both systems, a "start playback" command may be sent by either system. The start playback command sends a time to start playback on both systems. This start playback time is relative to the current "running time" established by a network based clock which both systems share and which is advancing at the rate of the underlying audio sample clock. This start playback time is set far enough into the future, relative to the current running time, such that the receiving system can process the command in time to start playback. The playback time may be the current running time, plus the start delay, plus an additional margin.

After the start playback command is sent (316) or received (318), the systems transition to the play state 212. Once in the play state, playback may be stopped by either system issuing a "stop playback" command which causes both systems to transition back to the stop state 202 via the stopping state 200. At any time after a prime command has been sent, either system may issue a "stop" command to cause itself and the other system to transition back to the stop state 202 via the stopping state 200.

As noted above, there are configurations where the multimedia IO hardware 120 is not connected to receive the video reference signal. In such a configuration, clocking information is communicated from the audio system 102 to the multimedia system 104 over the network connection 126, in order to prevent the two systems from drifting during playback after the multimedia system starts playback from the computed initial frame edge.

Figure 4A:
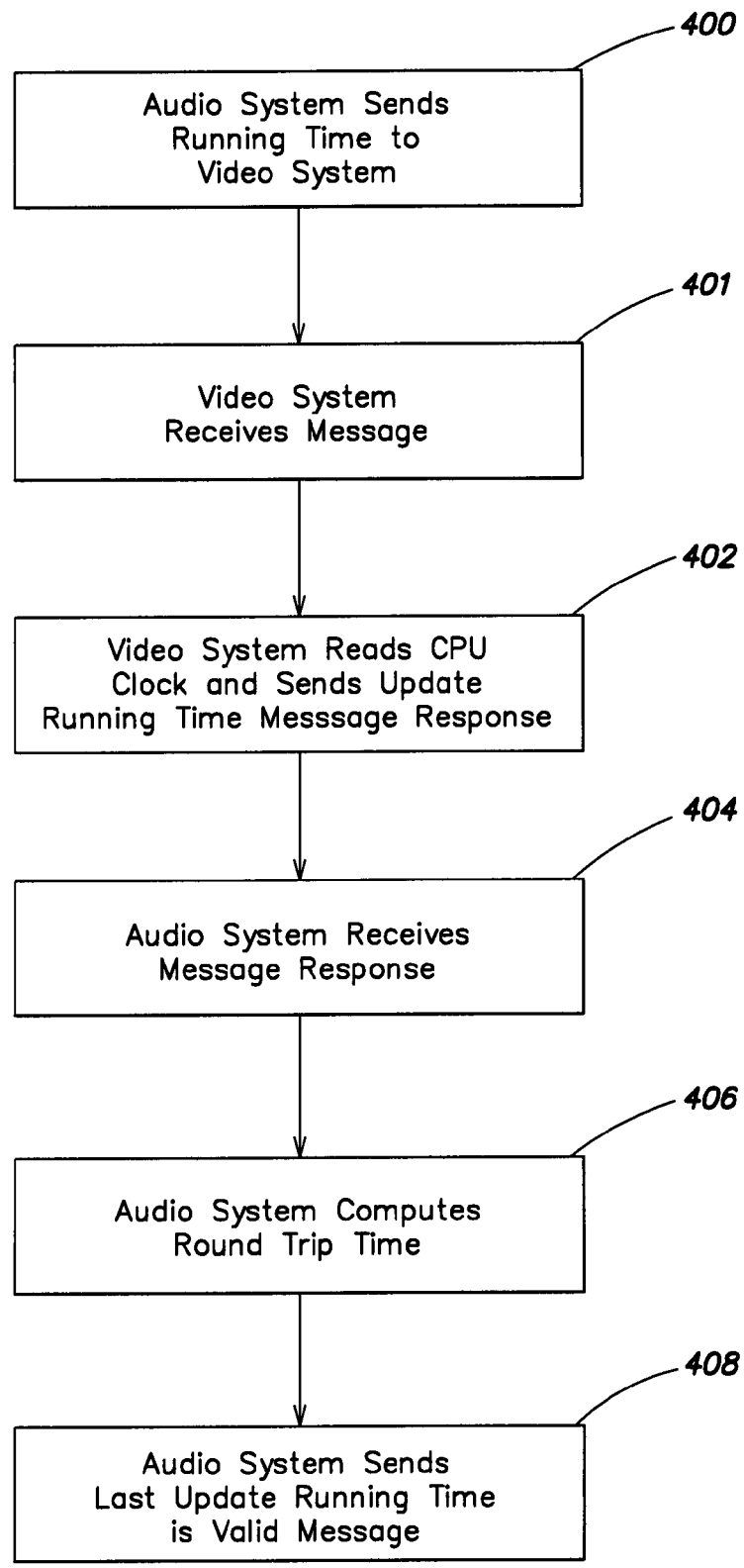
FIG. 4A is a flow chart of part of a process for sharing clock information between the interconnected systems over a network.

In particular, the audio clock information is distributed across the network connection 126 in the manner to be described in connection with FIGS. 4A and 4B. About every 250 milliseconds, the audio system sends (400) a message to multimedia system 104 to tell it the current "running time" in microseconds. The running time is based on the audio sample clock that is used in the audio system's playback engine. The multimedia system receives (401) a message called "update running time" and, in a high priority thread, immediately reads its own CPU clock and replies (402) back to audio system 102.

Audio system 102 receives (404) the update running time message response from the multimedia system, and determines (406) the round trip time from the time it sent the clock message to the multimedia system and when it received the reply. The audio system then sends (408) the round trip time in microseconds to the multimedia system as a "last update running time is valid" message.

Figure 4B:
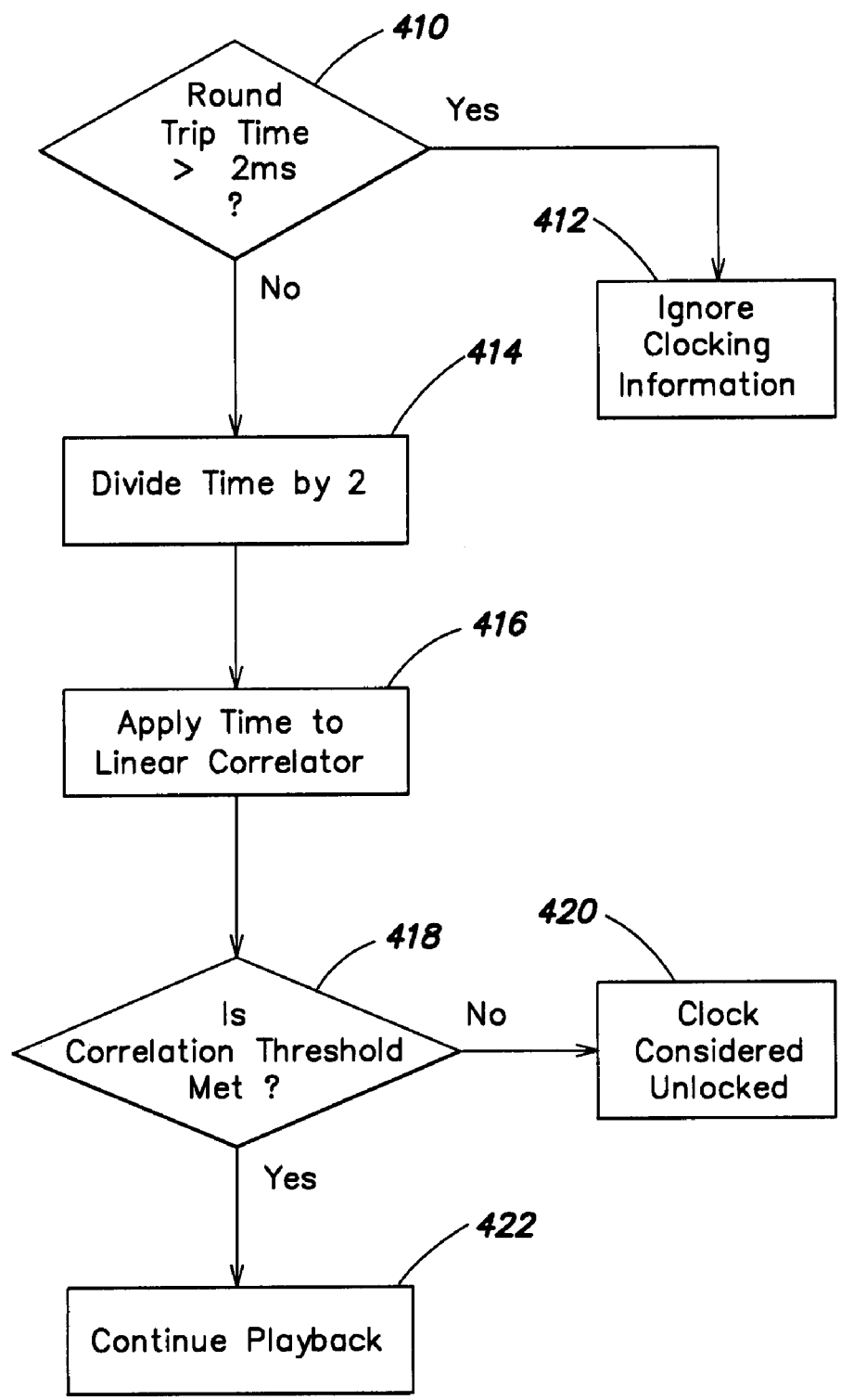
FIG. 4B is a flow chart of part of a process for sharing clock information between the interconnected systems over a network.

Referring now to FIG. 4B, if the round trip time is greater than (410) an appropriate threshold, such as 2 milliseconds, the multimedia system simply ignores (412) the clocking information. If the round trip time is less than 2 milliseconds (410), the multimedia system subtracts one half of the round trip time (414) to the running time sent from audio system, based on an assumption is that the messaging is close to being symmetric in timing and latency. Some other formula may be used if knowledge of any asymmetry in timing and latency is available. The multimedia system then applies (416) the measurement of running time and CPU clock time to a linear correlator to obtain the best fit straight line through the data. The last several measurements are kept in the linear correlator, depending on the size of an available memory (typically implemented as a FIFO memory) for the correlator. For example, 25 measurements may be kept.

If the correlation coefficient is less than (418) a correlation threshold, then the clock is considered to be unlocked (420) and an appropriate UI designation is displayed and playback is disabled. Otherwise, playback can continue (422). The "correlation threshold" is intended to indicate whether the data is sufficiently linear to justify extrapolating a clock from it. A suitable threshold of 0.995 has been empirically derived.

Anytime multimedia system 104 needs to determine what the overall system time is, it reads its own CPU clock then uses the best fit straight line in the clock correlator to determine what the overall multi-computer system running time is. All playback and record triggered startup events are specified in this overall system running time. Resets of the correlation happen at major events like document open and audio sample rate change.

Having now described the basic operation of playback of the system, some details of an example implementation for a packet format for Ethernet based communication over the network 126 will now be described. In general, both the audio system and the multimedia system include a computer program executing on the computer that process incoming messages and send out messages that utilize the same packet format.

The packet header includes a command type, message length, checksum, destination IP and source IP addresses, error codes, a packet serial number, a reply flag, and a protocol version. The packet payload includes data for the specified command type. Example byte formatting for such a packet is provided in the following table:

| Command Type | 4 bytes |
|---|---|
| Message Length | 2 bytes |
| Checksum | 2 bytes |
| Dest. IP Address | 4 bytes |
| Src. IP Address | 4 bytes |
| Error code | 4 bytes |
| Packet Serial Num. | 4 bytes |
| Reply flag | 1 byte |
| Major Protocol Version | 1 byte |
| Minor Protocol Version | 1 byte |
| Major Protocol Version | 1 byte |
| Command Version | 1 byte |
| System Type | 1 byte |
| Payload | n bytes |

There are several commands that may be used in this protocol. An example list of commands and their functions are the following. Each one of these commands has a unique value that is used to set the command type field in the packet header. Actual values used to designate each command are up to the implementation.

UpdateLinkState. This message tells the system to which the message is sent to update its state to the state contained in the message. This may be an instruction to "link" or "unlink", for example.

GoTo. This message tells the other system where to put the current play cursor. The parameter for the command is in terms of microseconds-from-midnight, which helps account for session/sequence starting timecode offset.

Prime. This message, as described above, instructs the other system to load up its play start data buffers and gives relevant playback parameters, such as a pre-roll start, an in point, an out point, a post-roll end, and a play speed.

SynchronizeClocks. This message, as described above, instructs the other system to synchronize clocks. It has no parameters.

StartPlayback. This message instructs the other system to start playing back and includes a start time as a parameter.

StopPlayback. This message instructs the other system to stop playing back. It has no parameters.

Connect. This message instructs the other system to start monitoring for messages in this protocol from the system sending the message. The message includes no parameters.

Disconnect. This message instructs the other system that it may terminate monitoring for messages in this protocol from the system sending the message. The message includes no parameters.

GetStartDelay. This message results in the other machine replying with a payload that includes the number of frames of delay.

UpdateRunningTime. This message provides an updated running time from the digital audio system to the digital video system. The parameter for this message is a running time.

LastUpdateRunningTimeValid. As described above, this message provides a round trip time to the other system. The parameter for this message is the round trip time.

FrameEdgeInRunningTime. This message is sent by the digital audio system, when it initiates playback, to the digital video system to provide the running time of the previous frame edge. This message is used in implementations where the digital video system does not include video IO hardware connected to the video reference signal. The parameter for this message is the running time of the previous frame edge.

GetFrameEdgeInRunningTime. This message is sent by the digital video system, when it initiates playback, to the digital audio system to request the running time of the previous frame edge. This message is used in implementations where the digital video system does not include video IO hardware connected to the video reference signal.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for processing digital audio, with synchronization with corresponding multimedia systems, comprising: a digital audio system; one or more digital multimedia systems; and a computer network interconnecting the digital audio system and the one or more digital multimedia systems; wherein the digital audio system and one or more digital multimedia systems implement a communication protocol for sending messages among the systems over the computer network to enable the systems to play back in synchronization; and wherein the communication protocol comprises: a connect message for instructing the digital audio system and the one or more digital multimedia systems to be connected; and a link message for instructing the digital audio system and the one or more digital multimedia systems to be linked for synchronized playback; and wherein a given system of the digital audio system and the one or more digital multimedia systems is configured to: in response to a connect message received while in a disconnected state, transition to a connected, unlinked state in which the system does not initiate or respond to playback instructions; and in response to a link message received while in the connected, unlinked state, to transition to a connected, linked state in which the system is configured to initiate or respond to playback instructions and wherein where the communications protocol includes instructions for placing the digital audio system and one or more digital multimedia systems into a machine state selected from stopping, stopped, priming, prime completed, synchronize clocks, synchronize clocks completed, and play.

2. The system of claim 1, wherein the one or more digital multimedia systems comprises one or more digital audio systems.

3. The system of claim 1, wherein the one or more digital multimedia systems comprises one or more digital video systems.

4. The system of claim 1, wherein the synchronization may be initiated by any of the digital audio system and one or more digital multimedia systems.

5. In a system including a computer network interconnecting a digital audio system with one or more multimedia systems, a computer-implemented method for enabling synchronized media playback between the digital audio system with the one or more multimedia systems, the method comprising implementing a communications protocol comprising the steps of transmitting a first message instructing the digital audio system and the one or more digital multimedia systems to be connected; transitioning the digital audio system and one or more digital multimedia systems from a disconnected state to a connected, unlinked state, in which the systems are configured not to initiate or respond to playback instructions; transmitting a second message instructing the digital audio system and the one or more digital multimedia systems to be linked for synchronized playback; and transitioning the digital audio system and the one or more digital multimedia systems from the connected, unlinked state to a connected, linked state in which the systems are configured to initiate or respond to playback instructions, and wherein the communications protocol includes instructions for stopping the digital audio system and one or more multimedia systems, priming the digital audio system and one or more multimedia systems, synchronizing clocks of the digital audio system and the one or more multimedia systems, and playing back digital audio on the digital audio system.

6. The computer-implemented method of claim 5, wherein the synchronization may be initiated by either the digital audio system or one or more digital multimedia systems.

7. A computer program product, comprising: a non-transitory computer readable medium; and computer program instructions stored in the computer readable medium that, when executed by a computer, instruct the computer to perform a method for enabling synchronized media playback between a digital audio system and one or more multimedia systems interconnected on a network, the method comprising implementing a communications protocol comprising the steps of: transmitting a first message instructing the digital audio system and the one or more digital multimedia systems to be connected; transitioning the digital audio system and the one or more digital multimedia systems from a disconnected state to a connected, unlinked state, in which the systems are configured not to initiate or respond to playback instructions; transmitting a second message instructing the digital audio system and the one or more digital multimedia systems to be linked for synchronized playback; transitioning the digital audio system and the one or more digital multimedia systems from the connected, unlinked state to a connected, linked state in which the systems are configured to initiate or respond to playback instructions; stopping the digital audio system and one or more multimedia systems priming the digital audio system and one or more multimedia systems: synchronizing clocks of the digital audio system and one or more multimedia and playing back digital audio on the digital audio system.

8. The computer program product of claim 7, wherein the synchronization may be initiated by either the digital audio system or one or more digital multimedia systems.

* * * * *